(12) United States Patent
He et al.

(10) Patent No.: US 8,928,527 B2
(45) Date of Patent: Jan. 6, 2015

(54) SYSTEMS AND METHODS FOR REDUCING ERROR DETECTION LATENCY IN LPV APPROACHES

(71) Applicant: Honeywell International Inc., Morristown, NJ (US)

(72) Inventors: Gang He, Morristown, NJ (US); Ivan Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 94 days.

(21) Appl. No.: 13/847,151

(22) Filed: Mar. 19, 2013

(65) Prior Publication Data

US 2014/0288733 A1    Sep. 25, 2014

(51) Int. Cl.
G01C 21/16    (2006.01)
G08G 5/02    (2006.01)
G01C 21/00    (2006.01)

(52) U.S. Cl.
CPC ............. G08G 5/02 (2013.01); G01C 21/005 (2013.01)
USPC ............ 342/357.32; 342/66; 342/357.3; 342/357.31; 702/85; 702/94; 702/95

(58) Field of Classification Search
None
See application file for complete search history.

(56) References Cited

U.S. PATENT DOCUMENTS

| | | | | |
|---|---|---|---|---|
| 5,600,329 | A * | 2/1997 | Brenner | 342/357.44 |
| 5,629,855 | A * | 5/1997 | Kyrtsos et al. | 701/300 |
| 6,216,065 | B1 * | 4/2001 | Hall et al. | 701/16 |
| 6,246,960 | B1 * | 6/2001 | Lin | 701/472 |
| 6,298,316 | B1 * | 10/2001 | Diesel | 702/190 |
| 6,417,802 | B1 * | 7/2002 | Diesel | 342/357.31 |
| 6,424,914 | B1 * | 7/2002 | Lin | 701/470 |
| 6,442,481 | B2 * | 8/2002 | Miller | 701/472 |
| 6,515,618 | B1 * | 2/2003 | Lupash | 342/357.29 |
| 6,549,829 | B1 | 4/2003 | Anderson et al. | |
| 6,711,479 | B1 * | 3/2004 | Staggs | 701/16 |
| 6,839,631 | B1 * | 1/2005 | Pemble et al. | 701/470 |
| 6,879,886 | B2 * | 4/2005 | Wilkins et al. | 701/3 |
| 7,218,278 | B1 * | 5/2007 | Arethens | 342/357.24 |

(Continued)

FOREIGN PATENT DOCUMENTS

| | | |
|---|---|---|
| EP | 2557552 | 2/2013 |
| WO | 2008056972 | 5/2008 |

OTHER PUBLICATIONS

European Patent Office, "Office Action from EP Application No. 14160166.6 mailed Aug. 14, 2014", "from Foreign Counterpart of U.S. Appl. No. 13/847,151", Aug. 14, 2014, Published in: EP.

(Continued)

Primary Examiner — Thomas Tarcza
Assistant Examiner — Richard Goldman
(74) Attorney, Agent, or Firm — Fogg & Powers LLC

(57) ABSTRACT

Systems and methods for reducing error detection latency in LPV approaches are provided. In certain embodiments, a method for navigational guidance includes calibrating inertial measurements acquired from an inertial navigation system with satellite-based augmentation system position measurements acquired from a satellite-based augmentation system to create corrected inertial navigation system positions. The method also includes determining whether the satellite-based augmentation system experienced a fault when the inertial measurements were calibrated with the satellite-based augmentation system position measurements. Further, when the satellite-based augmentation system did not experience a fault, the method includes monitoring the satellite-based augmentation system navigation position measurements based on the corrected inertial navigation system positions.

20 Claims, 5 Drawing Sheets

(56) References Cited

U.S. PATENT DOCUMENTS

| | | | |
|---|---|---|---|
| 7,373,223 B2* | 5/2008 | Murphy | 701/16 |
| 7,852,236 B2* | 12/2010 | Feyereisen et al. | 340/971 |
| 7,876,267 B2* | 1/2011 | Smith et al. | 342/464 |
| 7,911,380 B2* | 3/2011 | Petillon | 342/357.3 |
| 7,920,943 B2* | 4/2011 | Campbell et al. | 701/9 |
| 7,970,503 B2* | 6/2011 | Lapp et al. | 701/17 |
| 7,994,974 B2* | 8/2011 | Levy | 342/357.58 |
| 8,089,408 B2* | 1/2012 | Smith et al. | 342/464 |
| 8,355,866 B2* | 1/2013 | Smith et al. | 701/468 |
| 8,412,456 B2* | 4/2013 | Roh | 701/472 |
| 8,498,758 B1* | 7/2013 | Bell et al. | 701/4 |
| 8,566,033 B2* | 10/2013 | Clemenceau et al. | 701/469 |
| 8,594,879 B2* | 11/2013 | Roberge et al. | 701/23 |
| 8,686,900 B2* | 4/2014 | Whitehead et al. | 342/357.27 |
| 2002/0019701 A1* | 2/2002 | Miller | 701/214 |
| 2002/0109628 A1* | 8/2002 | Diesel | 342/357.14 |
| 2003/0135327 A1* | 7/2003 | Levine et al. | 701/220 |
| 2005/0159891 A1* | 7/2005 | Cohen et al. | 701/213 |
| 2006/0074558 A1* | 4/2006 | Williamson et al. | 701/213 |
| 2007/0106433 A1* | 5/2007 | He | 701/16 |
| 2008/0119970 A1* | 5/2008 | Campbell et al. | 701/8 |
| 2008/0172149 A1* | 7/2008 | Rouquette et al. | 701/16 |
| 2008/0255715 A1* | 10/2008 | Elchynski | 701/16 |
| 2009/0024325 A1* | 1/2009 | Scherzinger | 702/5 |
| 2009/0069960 A1* | 3/2009 | Lapp et al. | 701/16 |
| 2009/0278740 A1* | 11/2009 | Petillon | 342/357.14 |
| 2010/0161179 A1* | 6/2010 | McClure et al. | 701/41 |
| 2011/0118926 A1* | 5/2011 | Peake et al. | 701/25 |
| 2011/0208424 A1* | 8/2011 | Hirsch et al. | 701/208 |
| 2011/0257882 A1* | 10/2011 | McBurney et al. | 701/208 |
| 2011/0291887 A1* | 12/2011 | Pulford | 342/357.58 |
| 2012/0022780 A1* | 1/2012 | Kulik et al. | 701/220 |
| 2012/0136573 A1* | 5/2012 | Janardhanan et al. | 701/512 |
| 2012/0215410 A1* | 8/2012 | McClure et al. | 701/50 |
| 2013/0002857 A1* | 1/2013 | Kulik | 348/135 |
| 2013/0030775 A1* | 1/2013 | Clemenceau et al. | 703/2 |
| 2013/0046462 A1* | 2/2013 | Feyereisen et al. | 701/457 |

OTHER PUBLICATIONS

European Patent Office, "European Search Report from EP Application No. 14160166.6 mailed Aug. 5, 2014", "from Foreign Counterpart of U.S. Appl. No. 13/847,151", Aug. 5, 2014, pp. 13, Published in: EP.

* cited by examiner

SYSTEMS AND METHODS FOR REDUCING ERROR DETECTION LATENCY IN LPV APPROACHES

BACKGROUND

Aircraft landing systems typically provide high precision data relating to the position of an aircraft and the deviation of the aircraft position from a landing approach path. One type of aircraft landing system is a satellite-based augmentation system (SBAS) that provides guidance to an aircraft along a localizer performance with vertical guidance (LPV) approach path. An LPV approach is a high precision GPS aviation instrument approach that assists a pilot in determining a lateral position and a vertical position of the aircraft. For example, the LPV procedures define an approach path for the aircraft to fly during an approach at a given airport. The LPV approaches may be contained in a data-base that is used by the aircraft to generate deviation and guidance data for the approach of an aircraft.

However, LPV approaches are not authorized for use below certain altitudes due to the potential for misleading guidance information caused by the time to alert a flight crew of SBAS failures. In certain SBASs, the time to alert that an SBAS failure has occurred may exceed six seconds and in the period of time between the failure and the reporting of the failure, the SBAS may provide misleading guidance information. In low-visibility flight conditions, a flight crew may be unaware that guidance from the SBAS is possibly misleading, which misleading guidance information may lead to unsafe maneuvers and conditions. For example, to mitigate the risk of using misleading information during an approach, an aircraft may be limited to following an LPV approach to an altitude of 200 feet above ground level. The 200 foot limit provides an altitude buffer for the situation that the SBAS was providing misleading information during the time to alert the flight crew after a fault occurred.

SUMMARY

Systems and methods for reducing error detection latency in LPV approaches are provided. In certain embodiments, a method for navigational guidance includes calibrating inertial measurements acquired from an inertial navigation system with satellite-based augmentation system position measurements acquired from a satellite-based augmentation system to create corrected inertial navigation system positions. The method also includes determining whether the satellite-based augmentation system experienced a fault when the inertial measurements were calibrated with the satellite-based augmentation system position measurements. Further, when the satellite-based augmentation system did not experience a fault, the method includes monitoring the satellite-based augmentation system navigation position measurements based on the corrected inertial navigation system positions.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
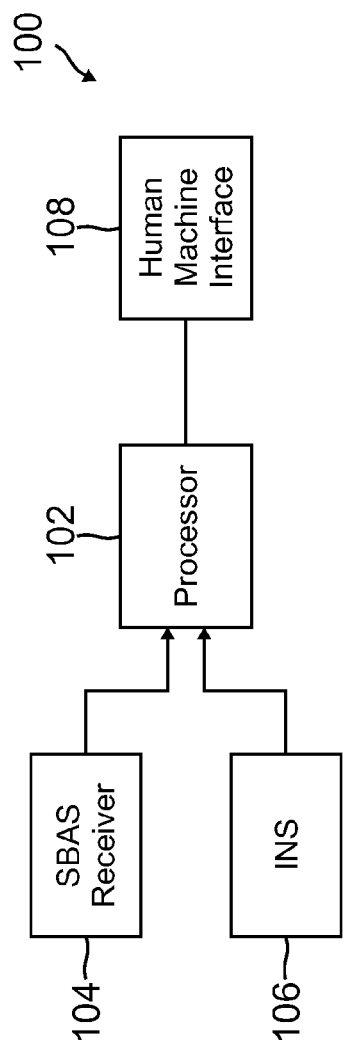
FIG. 1 is a block diagram of an aircraft landing system in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present invention provide systems and methods for reducing the latency period for reporting errors that arise in a satellite-based augmentation system (SBAS) for a localizer performance with vertical guidance (LPV) approach. To reduce the latency period, the landing system processes both GPS signals from the SBAS and inertial signals from a source of inertial measurements such as an inertial reference system (IRS), an inertial navigation system (INS), and the like, where the inertial measurements include inertial positions, velocities, accelerations, orientations, or the like. Initially, when the aircraft reaches a particular altitude or distance from the landing location, the landing system calibrates the inertial measurements from the INS with measurements provided by the SBAS. The calibration is performed with a substantial time left in an approach to ensure that unreported GPS/SBAS errors can be manifested before the SBAS data is used for navigation. When the inertial measurements are satisfactorily calibrated such that the relation of the INS measurements to the SBAS system measurements is known with a degree of statistical certainty, the landing system then captures additional reference GPS/SBAS data points and waits for a period of time to substantiate that the additional reference GPS/SBAS data points are not produced when the GPS/SBAS is experiencing a fault. During the substantiation period, an INS produces inertial output with its values corrected by the statistically calibrated differences between position measurements from the INS and the SBAS. This output is, however, only used to monitor the SBAS output after the substantiation period is completed and the captured reference points for the SBAS are determined to be free from unreported faults. When an LPV system operates normally, the INS measurements and the SBAS measurements are expected to track each other closely within preset limits. If the INS and SBAS measurements begin to deviate beyond the preset limits or function unpredictably in relation to one another, then a fault is recorded and the LPV approach is aborted because the SBAS measurements are no longer reliable. For example, when the INS measurements and the SBAS measurements are calibrated and the data used for calibration is determined to be correct data and not misleading, when the difference between the corrected INS measurements and the SBAS positions exceeds the predefined limits, the system can alert the crew that an error has occurred within a period of time that is significantly less than the time to alert the crew that SBAS errors have occurred.

FIG. 1 is a block diagram of a landing system 100 that implements systems and methods for reducing error detection latency in LPV approaches. Landing system 100 includes a processor 102 that executes computer readable instructions that allow the processor 102 to monitor and/or calculate position measurements from different navigation sensing systems. For example, the processor 102 receives position measurements from a SBAS receiver 104. The SBAS receiver 104 is a system that receives SBAS messages from satellites that support wide-area or regional augmentation of GPS data through the use of additional satellite-broadcast messages. For examples, SBAS systems include the Wide Area Augmentation System (WAAS), the European Geostationary Navigation Overlay Service (EGNOS), the Japanese Multifunctional Satellite Augmentation System (MSAS), and the like. SBASs augment the performance of GPS by using separate signals to provide a set of corrections that improve the accuracy of the position calculation performed by the user satellite receiver. In particular, EGNOS provides these corrections not only for GPS but also for the Global Orbiting Navigation Satellite System (GLONASS). SBASs are based on the principle of the spatial and temporal correlation of measurement errors that arise when making distance measurement from a space born source. The difference between the theoretical and the real measurement performed in a known position can be found, with similar values, in other real measurements performed nearby the known position. In other words, this principle says that the distance measurements made in a small geographical area may be affected by the same errors. So, once you know the measurement error in one place, it can be used as a correction for the distance measurements made in nearby places. In a scenario where several reference points are available, a wide area correlation law, which models the difference in distance measurements, can be derived. The data collected by a network of reference stations are processed and then transmitted to the users, by means of geostationary satellites, on a signal having the same frequency as GPS (L1=1575.42 MHz), where the signal has a different data format than standard GPS signals. SBAS messages contain information for the computation of pseudorange corrections, but also integrity parameters, used to estimate the degree of confidence of position computations.

As the SBAS receiver 104 operates, the SBAS receiver 104 can experience faults that arise due to inaccuracies or failures in the infrastructure of the SBAS. The inaccuracies or failures that arise could cause significant SBAS position errors. In certain implementations, faults associated with communications through the SBAS receiver 104 are detected within a latency period. The latency period being a period of time between the moment when a fault occurs and when the SBAS receiver 104 detects the fault and is able to notify an external system or a user of the fault. The latency period can be lengthy, for example, in certain SBASs, a latency period may exceed 6 seconds. Due to the possible duration of the latency period, limits are placed on the use of an SBAS when following an LPV approach. For example, LPV approaches can be followed down to elevations of 200 feet above ground level. In certain examples, if the SBAS were used below 200 feet above ground level, an error during the latency period may lead to a significant navigation error that could possibly endanger the aircraft, where the risk increases as the aircraft's position becomes closer to a runway or other landing surface.

To shorten the latency period in the detection of faults, the landing system 100 also includes an inertial navigation system (INS) 106. The INS 106 is a sensor device configured to sense motion and to output data that corresponds to the sensed motion. In one embodiment, IMU 106 comprises sets of gyroscopes and accelerometers that determine information about motion in any of six degrees of freedom (that is, lateral motion in three perpendicular axes and rotation about three perpendicular axes). Like the SBAS, the INS 106 is also subject to errors. For example, the components of the INS 106 may fail during operation and provide erratic misleading information. Also, measurements from the INS 106 inherently drift over time. However, the probability of a simultaneous failure of the components of the INS 106 and the SBAS system infrastructure is quite small. For example, the chance of a gyroscope in the INS 106 failing at the same time of an SBAS reference station is unlikely. Additionally, the INS 106 may be contained in a well packaged on-board system that provides immediate failure information where any INS failure will discontinue the use of low-visibility approach operations. Further, if a failure occurred simultaneously to both the INS 106 and the SBAS system infrastructure, it is even more unlikely that the errors would provide the same misleading information. Further, the drift of the accuracy of the INS 106 can be characterized over time such that INS errors related to drift can be reasonably predictable.

Due to the low probability of a simultaneous failure of both the INS 106 and the SBAS infrastructure, especially where the failures produce the same error, the landing system 100 is able to use the measurements from the INS 106 to reduce the latency period for detecting faults in measurements received over the SBAS receiver 104. To use measurements from the INS 106 to detect faults in data received over the SBAS receiver 104, the processor 102 calibrates data from the INS 106 with data received through the SBAS receiver 104. When the data is calibrated, the processor 102 monitors the navigational data acquired from both the INS 106 and the SBAS receiver 104. To monitor the navigational data, the processor 102 compares the navigational data 106 to navigational data from the SBAS receiver 104. If the navigational data from the two different systems is not reasonably similar, the processor 102 determines that a fault has occurred with either the INS 106 or the SBAS system infrastructure. If the SBAS receiver 104 is currently being used in an LPV approach when the data from the two different systems becomes substantially dissimilar, the processor 102 logs a fault and communicates the fault to a user and also abandons the LPV approach. In certain implementations, when the landing system 100 abandons the LPV approach, the landing system 100 uses a different approach system to land the aircraft, such as an instrument landing system, GBAS, and the like.

In certain embodiments, when using measurements from the INS 106 to decrease the latency in failure detection for measurements through the SBAS receiver 104, the processor 102 executes an inertial coasting algorithm. The inertial coasting algorithm is an algorithm that segregates SBAS failures when performing an LPV approach procedure. To perform the inertial coasting algorithm, the processor performs different functions based on a particular time period in the approach procedure. For example, in one implementation, the inertial coasting algorithm includes three different time periods. These time periods are the calibration period, the substantiation period, and the monitoring period. During the calibration period, the processor 102 executes the inertial coasting algorithm to characterize the drift in measurements from the INS 106 with respect to position measurements acquired through the SBAS receiver 104. In at least one embodiment, the position output of the inertial coasting algorithm is a three dimensional point in space that can be compared to position measurements from an SBAS. An SBAS is an accurate position source when the measurement is not produced by an SBAS containing latent failures. Further, the calibration period ensures that INS output can be characterized to perform with precision similar to the SBAS over a limited time period when the inertial coasting algorithm output is is not affected by subsequent SBAS failures during the time period. The next period is the substantiation period, where the processor 102, having calibrated the measurements from the INS 106 with the measurements from the SBAS receiver 104, determines whether the data acquired during the calibration period and the reference data at the end of the calibration period or the start of the substantiation period is reliable by waiting at least a latency period for the SBAS after the end of the calibration period. Any errors or faults in the SBAS data used to calibrate the INS 106 and the SBAS receiver 104 would become apparent during the substantiation period. When no faults arise during the substantiation period, the landing system 100 enters the monitoring period where the landing system 100 uses the output from the inertial coasting algorithm to monitor the SBAS data as the aircraft follows an LPV approach. If the data produced by the inertial coasting algorithm begins to markedly diverge from SBAS position measurements during the monitoring period, the processor 102 logs a fault and aborts the LPV approach. In certain embodiments, when the processor 102 logs a fault, the fault is communicated to a pilot or other member of the flight crew through a human machine interface 108. By notifying the pilots and flight crew more quickly, the pilots and flight crew are able to avoid using misleading information when conducting their landing procedures.

Figure 2:
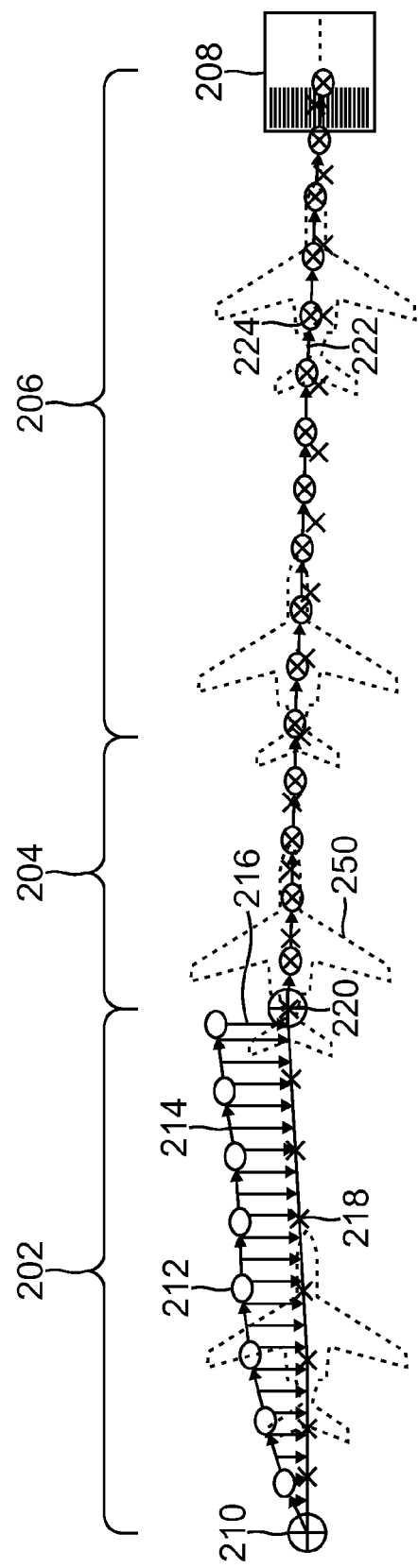
FIG. 2 is a diagram illustrating an approach path in one embodiment described in the present disclosure.

FIG. 2 is a diagram of an aircraft 250 approaching a runway 208, where a processor 102 in a landing system 100 executes the inertial coasting algorithm when landing the aircraft 250. As described above, the inertial coasting algorithm includes three different phases. The first phase is the calibration phase 202. The landing system 100 in FIG. 1 enters the calibration phase 202 when the aircraft reaches a particular altitude or approach distance from the airport runway 208. For example, when the aircraft 250 reaches a distance of 2 miles away from the runway 208, the processor 102 on the landing system 100 begins the calibration phase 202. In certain implementations, when the landing system 100 begins the calibration phase, the processor 102 initially establishes the position of the aircraft at the beginning of the inertial coasting algorithm as a calibration reference point 210. The calibration reference point 210 is used to relate the SBAS positions 218 to INS positions 212.

In certain implementations, to calibrate the data produced by the INS 106 with the data received through the SBAS receiver 104, the processor 102 on the landing system 100 determines the IRS inertial velocity 214 between each INS position measurement 212 from the INS 106. The landing system 100 then identifies the difference between the distance calculated from the data from the INS 106 and the SBAS positions 218 from the SBAS receiver 104 throughout the calibration period 202. The processor 102 uses the differences between the SBAS positions 218 and the INS position measurements 212 to identify an average drift 216 of the INS position measurements 212 over time. When the variance of the average drift 216 becomes sufficiently small such that the landing system 100 is able to predict the drift of the data produced by the INS 106 with reasonable certainty, the processor 102 determines that the data from the INS 106 is calibrated with the data from the SBAS receiver 104 and the inertial coasting algorithm enters the substantiation period 204.

In certain implementations, when the inertial coasting algorithm is in the substantiation period 204, the inertial coasting algorithm establishes a navigation reference point 220 and references data from the INS 106 against the navigation reference point 220. The inertial coasting algorithm then applies average drift corrections to inertial data received from the INS 106 to create corrected INS measurements 224. During the substantiation period 204, the inertial coasting algorithm determines whether the SBAS positions 218 are substantially close to the corrected IRS inertial velocity 222 based on the corrected INS measurements 224. If the SBAS measurements 218 are substantially close to the corrected IRS inertial velocity 222 for a period of time that exceeds the latency period for fault reporting for the SBAS, then the inertial coasting algorithm determines that the data used to calibrate the INS measurements 214 with the SBAS measurements 218 was based on correct data and thus the inertial coasting algorithm enters the monitoring period. However, if the SBAS measurements 218 are not substantially close to position data derived from the corrected INS velocity 222, such that the positions predicted from measurements received from the INS 106 and the position data from the SBAS measurements 218 are diverging beyond what would be normally expected due to drift in the performance of the INS 106, then the inertial coasting algorithm determines that the calibration data was based on faulty data. Further, if the SBAS measurements 218 register a fault during the substantiation period 204, then the inertial coasting algorithm executing on the processor 102 determines that the calibration data was based on faulty data received through the SBAS receiver 104. In certain implementations, when the inertial coasting algorithm determines that the calibration data was based on faulty data, the landing system 100 may abort the use of an LPV approach.

As stated above, when the substantiation period 204 has completed and no fault has been registered with the SBAS 104 and the position predicted by the SBAS positions 218 and the corrected INS positions 224 are substantially similar, the inertial coasting algorithm enters the monitoring period 206. During the monitoring period 206, the inertial coasting algorithm monitors the SBAS positions 218 and the corrected INS positions 224 to identify whether the SBAS positions 218 and the corrected INS positions 224 diverge from one another. If the SBAS positions 218 and the corrected INS positions 224 diverge, the inertial coasting algorithm determines that a fault has occurred with either the SBAS 104 or with the INS 106. As the fault may be with the SBAS 104, the landing system 100 responds by aborting the LPV approach. If the SBAS positions 218 and the corrected INS positions 224 are substantially similar, then the landing system 100 uses the data received from the SBAS receiver 104 to follow an LPV approach when landing the aircraft on the runway 208.

During the execution of the inertial coasting algorithm by the processor 102, the calibration period 202, the substantiation period 204, and the monitoring period 206 may be of different duration lengths and may be selected based on certain constraints. For example, the monitoring period 206 may begin at a particular moment as dictated by the LPV approach, for example, the monitoring period 206 begins at or before the moment when the SBAS information is used for navigation. Also, the substantiation period 204 is constrained in that the substantiation period is longer than the latency period for identifying faults in data acquired through the SBAS receiver 104. The substantiation period 204 is longer than the latency period to verify that the data that was used to calibrate the INS positions 212 with the SBAS position 218 was not based on faulty SBAS data. Also, the calibration period 202 has a sufficient duration to accurately calibrate the SBAS position 218 and the INS positions 212.

Figure 3:
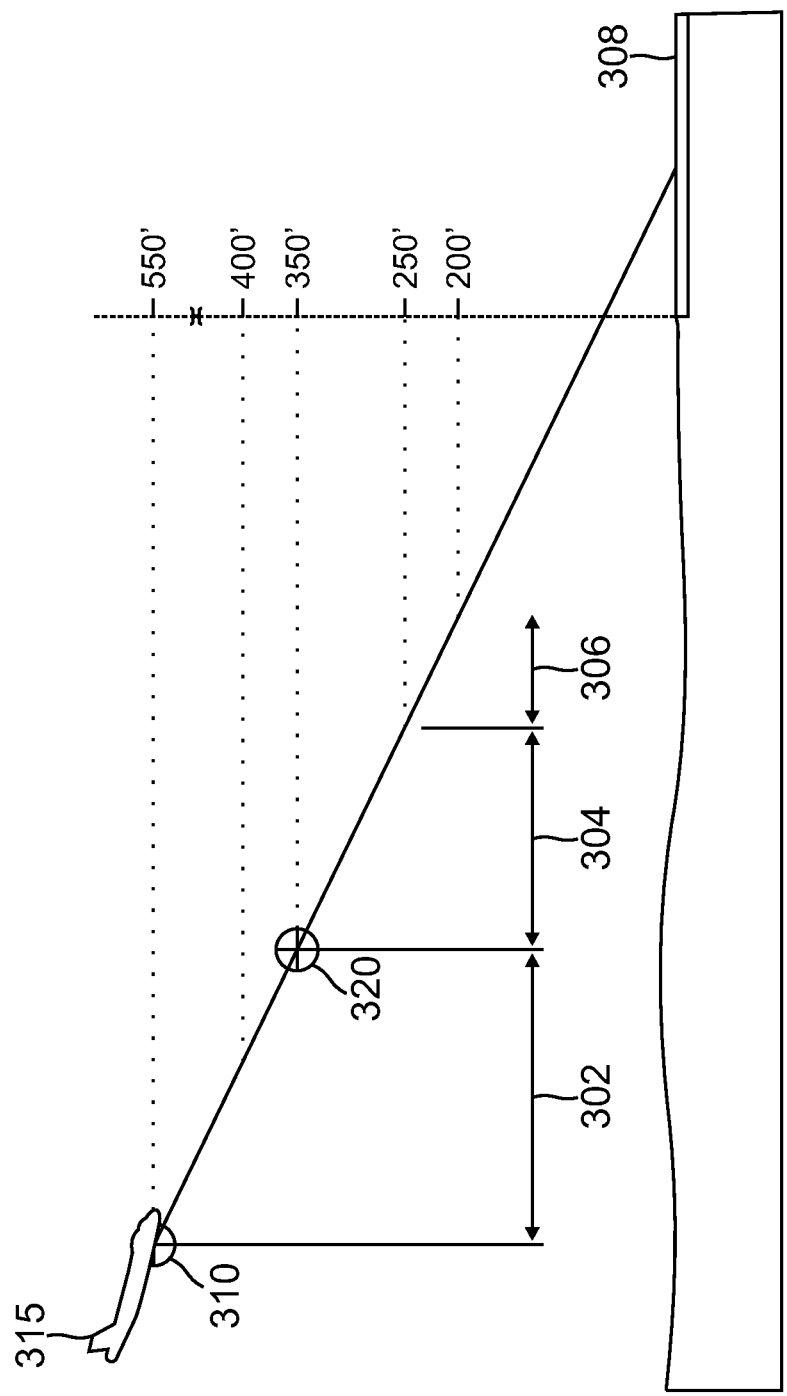
FIG. 3 is a diagram illustrating a profile view of an approach path in one embodiment described in the present disclosure.

FIG. 3, is a diagram illustrating the descent of an airplane 315 as the inertial coasting algorithm passes through the calibration period 302, the substantiation period 304, and the monitoring period 306. As stated above, the inertial coasting algorithm can begin when the aircraft 315 is a certain distance away from the runway 308 or other landing site. Alternatively, the inertial coasting algorithm can also begin when the aircraft 315 reaches a certain elevation in relation to the runway 308. For example, the calibration period 302 may begin at an elevation of 550 feet. When the position data from the INS is sufficiently calibrated with the data from the SBAS such that the variance of the INS drift corrections is within a predefined tolerance, the inertial coasting algorithm enters the substantiation period 304. Alternatively, the inertial coasting algorithm enters the substantiation period 304 at a specific altitude where the altitude difference between calibration reference point 310 and the navigation reference point 320 provides enough time for the landing system to calibrate the INS data with the SBAS position measurements. In one example, the inertial coasting algorithm enters the substantiation period 304 when the aircraft is at an elevation of 350 feet, where the time for the aircraft 315 to pass from the calibration reference point 310 to the navigation reference point 320 was sufficient for the calibration of the INS data with the SBAS position measurements. As discussed above, the substantiation period 304 is longer than the latency period to ensure that misleading information is not used to calibrate the INS data with the SBAS position measurements. When the substantiation period 304 ends, the inertial coasting algorithm enters the monitoring period 306. In one implementation, the monitoring period 306 begins at the point where the SBAS position data is used for an LPV approach. In an alternative implementation, the monitoring period 306 begins at a point where the latency period for faults begins to endanger the safety of the flight crew. As illustrated in FIG. 3, the monitoring period 306 begins when the aircraft is at an altitude of 250 feet. In certain implementations, flight regulations do not permit the use of SBAS position data when guiding an aircraft through an LPV approach below 200 feet because of the length of the latency period for reporting faults in the SBAS. Thus, the monitoring period 306 begins before the aircraft reaches 200 feet in elevation so that the SBAS position data is calibrated with the INS data.

Figure 4B:
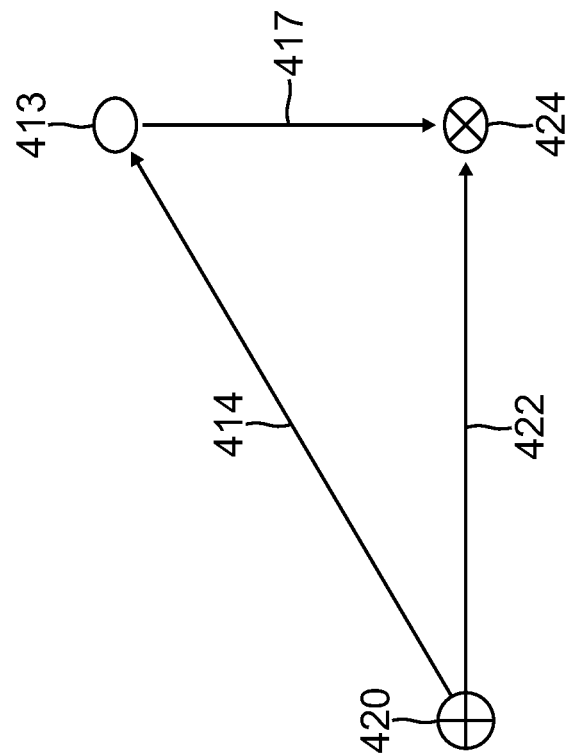
FIGS. 4A and 4B are diagrams illustrating the correction of inertial position measurements in embodiments described in the present disclosure.
Figure 4A:
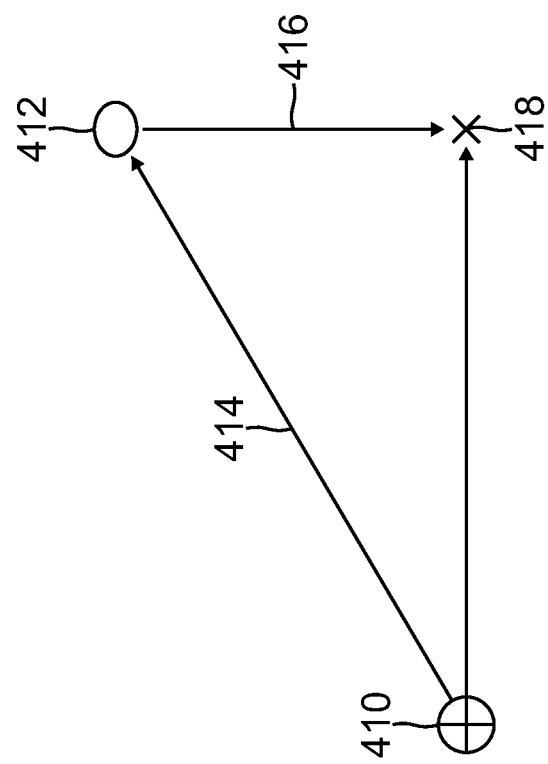

FIGS. 4A and 4B illustrate the calculation of INS drift 416 in different periods of the inertial coasting algorithm. FIG. 4A illustrates the calculation of INS drift 416 during a calibration period (such as 202 or 302) and FIG. 4B illustrates the calculation of INS drift 416 during a substantiation period (such as 204 or 304) or monitoring period (such as 206 or 306). As stated, FIG. 4A illustrates the calculation of INS drift 416 during the calibration period of the inertial coasting algorithm. An INS (such as INS 106) produces high precision velocity vectors and, once the INS is initialized with a position, the INS computes its own updated position and velocity by integrating information received from motion sensors such as gyroscopes and accelerometers. The INS requires no external references in order to determine its position and velocity once it has been initialized. INSs experience inaccuracies due to small errors in the measurement from the internal sensors in an INS. The small errors are compounded over time and become progressively larger. The small velocity errors that compound over time are referred to as drift rate. For example the drift rate for some INSs can be on the order of 0.5 nautical miles per hour or 0.8 feet/second when the INS does not receive any GPS updating.

The inertial coasting algorithm compensates for the small errors by characterizing the INS drift 416 relative to the SBAS positions 418. When the calibration process is initiated, a calibration reference point 410 is captured, where the calibration reference point 410 is a high precision SBAS position in three dimensions (latitude, longitude, and altitude). From the calibration reference point 410, INS inertial velocities 414 are integrated to produce integrated INS positions 412. From the integrated INS positions 412 and the SBAS positions 418, a statistical drift vector 416 is calculated, the statistical drift vector 416 is the drift rate calculated from the integrated INS positions 412 and the SBAS positions 418 and represents the statistical average drift velocity of the INS data relative to the SBAS data. For example, the processor begins executing the inertial coasting algorithm by capturing the calibration reference point 410 from the SBAS position data. The distance to the next SBAS position 418 is determined by taking the differences in latitude, longitude, and altitude values between the next SBAS position 418 and the calibration reference point 410. During the time that the inertial coasting algorithm determines the difference between the next SBAS position 418 and the calibration reference point 410, inertial velocities 414 are integrated from the calibration reference point 410 to determine the integrated INS position 412. When differences between the integrated INS position 412 and SBAS position 418 are computed and averaged over the calibration period, an average INS drift may be determined.

FIG. 4B illustrates the use of the calculated average INS drift 417 during the substantiation and monitoring periods. At the beginning of the substantiation period, the inertial coasting algorithm identifies and establishes a navigation reference point 420 based on SBAS positions received at the beginning of the substantiation period. In certain implementations, the navigation reference point 420 is the first SBAS position received from an SBAS at the beginning of the substantiation period. In certain implementations, after establishing the navigation reference point 420, the inertial coasting algorithm may work independently of received SBAS positions. When the inertial coasting algorithm operates independently of the SBAS, the output of the inertial coasting algorithm is a corrected INS measurements 424. In at least one implementation, the corrected INS measurements 424, output from the inertial coasting algorithm, is not used by the landing system for navigation purposes until after the substantiation period and beginning of the monitoring period. For example, a new SBAS position is captured and designated as the navigation reference point 420. The inertial coasting algorithm integrates the INS inertial velocities 414 starting at the navigation reference point 420 to determine an intermediate integrated INS position 413. When the inertial coasting algorithm identifies the intermediate integrated INS position 413, the inertial coasting algorithm applies the average INS drift 417 that was calculated during the calibration period. The inertial coasting algorithm applies the average INS drift 417 to the intermediate integrated INS position 413 to determine the corrected INS measurements 424. The inertial coasting algorithm may integrate subsequent INS inertial velocities from the previously calculated integrated IRS positions, where the inertial coasting algorithm applies an accumulated corrected INS measurements 424 since the navigation reference point 420. Alternatively, the inertial coasting algorithm may integrate subsequent INS inertial velocities from the previously calculated corrected INS measurements 424, where the inertial coasting algorithm applies the average INS drift 417 to each calculation of the intermediate integrated INS position 413.

In an alternative implementation, the landing system uses the SBAS position data for navigation during the monitoring period and uses the corrected INS measurements 424 to determine whether errors arise in the SBAS position data. For example, the corrected INS measurements 424 should be within a threshold value of acquired SBAS position data. When the corrected INS measurements 424 and the SBAS position data 418 begins to diverge outside of an acceptable threshold, the landing system may determine that either the SBAS or the INS is producing misleading data. Because, of the possible misleading data produced by either the SBAS or the INS, the landing system may stop using measurements from the inertial coasting algorithm or the SBAS position data 418 when conducting a landing approach. Thus, in some implementations, the landing system aborts LPV approaches to a landing site based on SBAS position data 418 due to the risk of using misleading data.

Figure 5:
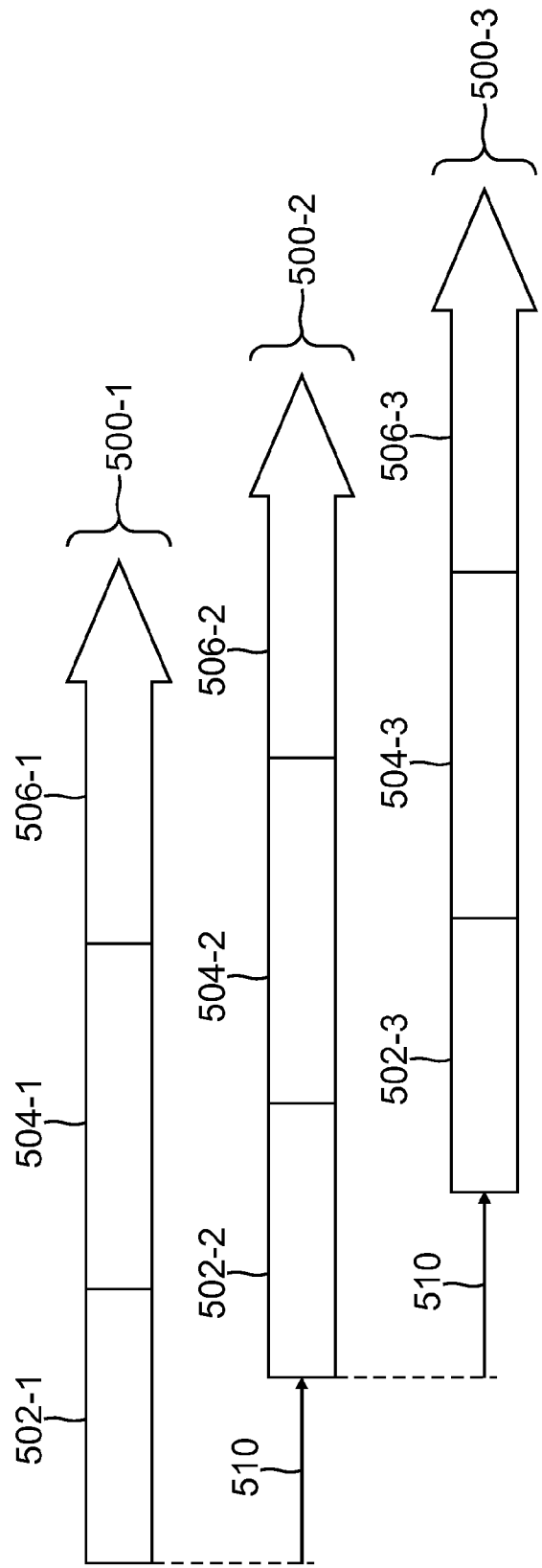
FIG. 5 is a diagram illustrating the cascading of multiple instances of an inertial coasting algorithm in one embodiment described in the present disclosure.

FIG. 5 is a diagram illustrating cascaded instances (500-1-500-3) of an inertial coasting algorithm, where the inertial coasting algorithm executes as described above. To minimize the drift errors that arise due to measurements taken by the INS, the processor may execute multiple instances (500-1-500-3) of an inertial coasting algorithm that can be executed simultaneously, where each instance (500-1-500-3) starts executing at different times and contains a respective calibration period 502-1-502-3, substantiation period 504-1-504-2, and monitoring period 506-1-506-2. The time intervals 510 between instances (500-1-500-3) of the algorithms can be large (such as several seconds to minutes) or short (such as 100-200 milliseconds). The length of the time interval 510 between instances (500-1-500-3) is directly proportional to the size of the integration errors that accumulate in the instances (500-1-500-3) of the inertial coasting algorithm. For example, if there were three instances of inertial coasting algorithms currently executing, the first instance 500-1 may commence the execution of the calibration period 502-1 at 550 feet above a runway. A second instance 500-2 may commence execution of the calibration period 502-2 at a time interval 510 of 15 seconds after the first instance 500-1 began execution. Further, a third instance 500-3 of an inertial coasting algorithm may commence execution of the calibration period 502-3 at a time interval 510 of 15 seconds after the second instance 500-2 began execution. In an alternative implementation the time intervals between the different instances 500-1-500-3 have different time durations. The most recently initiated instance of the executing instances 500-1-500-3 of the inertial coasting algorithm that is producing valid outputs is used to reduce the accumulated drift errors that affect position, altitude, and directional coasting as an aircraft lands on a runway.

Figure 6:
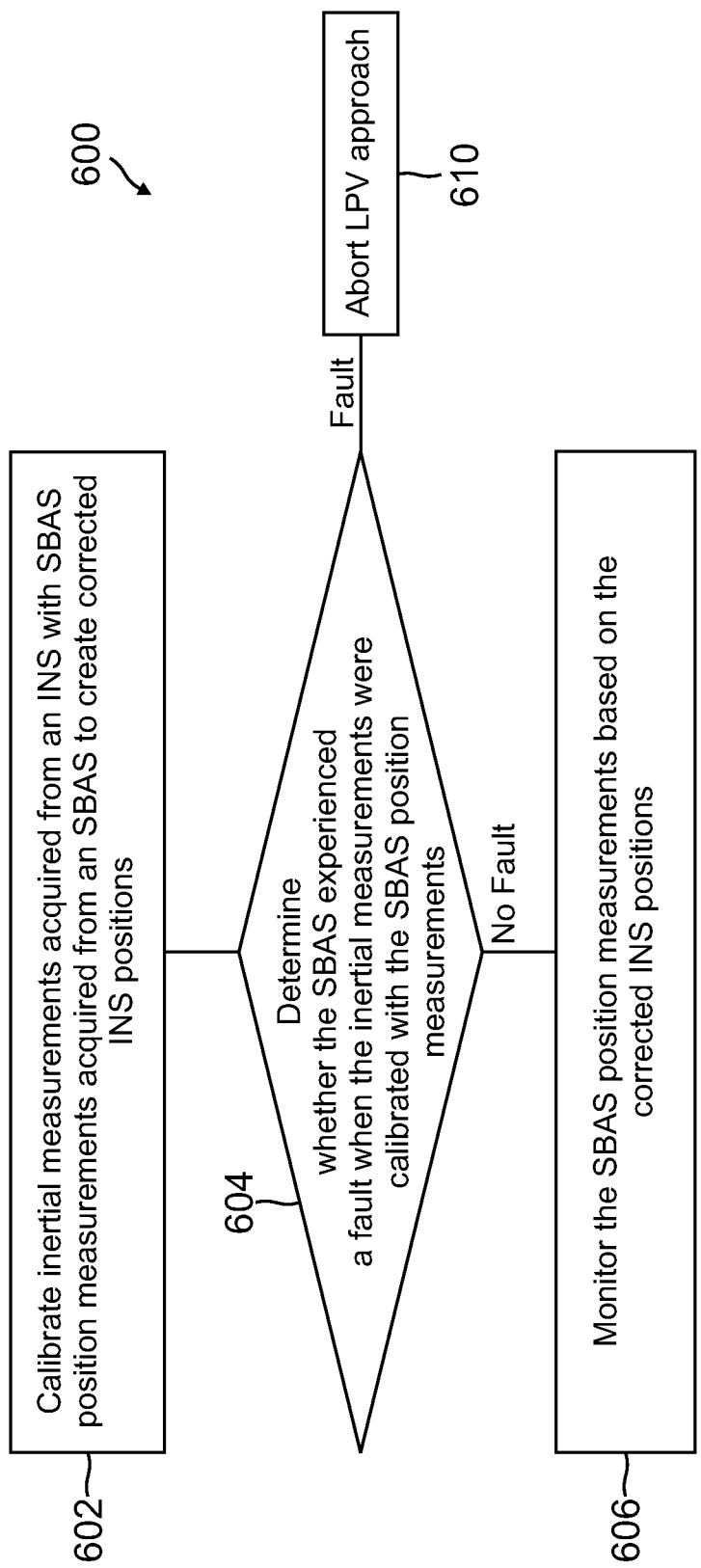
FIG. 6 is a flow diagram for reducing error detection latency in LPV approaches in one embodiment described in the present disclosure.

FIG. 6 is a flow diagram of a method 600 for reducing error detection latency. Method 600 proceeds at 602 where inertial measurements acquired from an INS are calibrated with SBAS position measurements acquired from an SBAS to create corrected INS positions. For example, during the calibration of the INS with the SBAS, a landing system calculates the average drift of the INS in relation to the SBAS over a period of time. Method 600 proceeds at 604 where it is determined whether the SBAS experienced a fault when the inertial measurements were calibrated with the SBAS position measurements. For example, when an SBAS experiences certain faults, the reporting of the fault may take over six seconds. During the latency period for reporting faults, an SBAS may provide misleading data. To prevent the misleading data from being used in the landing of an aircraft, the landing system waits a period of time that exceeds the latency period after the calibration of the INS and SBAS data to ensure that INS and SBAS were not calibrated with misleading data.

In certain implementations, when a fault is not experienced, method 600 proceeds at 606 where the SBAS position measurements are monitored based on the calibrated inertial measurements. For example, the landing system uses the calculated average drift to adjust inertial measurements from the INS. Further, the landing system may use SBAS position measurements to determine the position of the aircraft. Also, the landing system compares the calibrated inertial measurements against the SBAS position measurements to monitor the SBAS for errors. If the calibrated inertial measurements diverge from the SBAS position measurements, the divergence can be used as an indication that a fault occurred in either the SBAS or the INS. Further, when a fault occurs in either the SBAS or the INS and the landing system is guiding the aircraft down an LPV approach, method 600 proceeds at 610 where a landing system aborts an LPV approach.

Several means are available to implement the systems and methods of the current invention as discussed in this specification. For example, elements of the processor 102 in FIG. 1 can be realized through discrete electronics, digital computer systems, digital signal processors, microprocessors, programmable controllers and field programmable gate arrays (FPGAs) or application-specific integrated circuits (ASICs). Therefore, other embodiments of the present invention are program instructions resident on non-transient computer readable storage media which when implemented by such means enable them to implement embodiments of the present invention. Computer readable storage media are any form of a physical non-transitory computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other non-transitory form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

EXAMPLE EMBODIMENTS

Example 1 includes an aircraft landing system on an aircraft, the system comprising: an inertial navigation system configured to make inertial measurements of motion for the aircraft; a satellite-based augmentation system configured to provide satellite-based augmentation system position measurements of the aircraft; and a processor configured to receive the inertial measurements from the inertial navigation system and receive the satellite-based augmentation system position measurements from the satellite-based augmentation system, wherein the processor executes instructions that cause the processor to: calibrate the inertial measurements to the satellite-based augmentation system position measurements; determine whether the satellite-based augmentation system experienced a fault when the inertial measurements were calibrated with the satellite-based augmentation system position measurements; and when the satellite-based augmentation system did not experience a fault, monitor the satellite-based augmentation system navigation position measurements based on the calibrated inertial measurements.

Example 2 includes the aircraft landing system of Example 1, wherein the aircraft is navigated along a localizer performance with vertical guidance approach.

Example 3 includes the aircraft landing system of any of Examples 1-2, wherein the processor calibrates the inertial measurements to the satellite-based augmentation system position measurements by: identifying an aircraft position as a calibration reference point based on the satellite-based augmentation system position measurements; integrating inertial velocities from the inertial navigation system over a period of time relative to a calibration reference point to identify an integrated inertial navigation system position; and calculating a time dependent inertial navigation system drift based on the difference between the integrated inertial navigation system position and a corresponding satellite-based augmentation system position measurement.

Example 4 includes the aircraft landing system of any of Examples 1-3, wherein the processor interpolates a plurality of calculated inertial navigation system drifts to find an average time dependent difference between a plurality of integrated inertial navigation system positions and a corresponding plurality of satellite-based augmentation system position measurements.

Example 5 includes the aircraft landing system of any of Examples 1-4, wherein the processor determines that the satellite-based augmentation system did not experience a fault when the inertial measurements were calibrated by determining that the satellite-based augmentation system did not experience a fault for a period of time greater than a latency period for identifying faults in the satellite-based augmentation system.

Example 6 includes the aircraft landing system of any of Examples 1-5, wherein the processor monitors the satellite-based augmentation system navigation position measurements based on the calibrated inertial measurements by: integrating inertial velocities from the inertial navigation system over a period of time to identify an integrated inertial navigation system position; and calculating a corrected inertial navigation system position by subtracting an average inertial navigation system drift from the integrated inertial navigation system position.

Example 7 includes the aircraft landing system of Example 6, wherein the processor further monitors satellite-based augmentation system position measurements of the aircraft based on the calibrated inertial measurements by: comparing the satellite-based augmentation system position measurements against the corrected inertial navigation system position; and when the difference between the satellite-based augmentation system position measurements and the corrected inertial navigation system position exceed a threshold, determining that at least one of the inertial navigation system and the satellite-based augmentation system is providing misleading data.

Example 8 includes the aircraft landing system of Example 7, wherein the aircraft landing system provides alert information to flight crews to determine whether to abort a localizer performance with vertical guidance approach when at least one of the inertial navigation system and the satellite-based augmentation system is providing misleading data.

Example 9 includes a method for navigational guidance, the method comprising: calibrating inertial measurements acquired from an inertial navigation system with satellite-based augmentation system position measurements acquired from a satellite-based augmentation system to create corrected inertial navigation system positions; determining whether the satellite-based augmentation system experienced a fault when the inertial measurements were calibrated with the satellite-based augmentation system position measurements; and when the satellite-based augmentation system did not experience a fault, monitoring the satellite-based augmentation system navigation position measurements based on the corrected inertial navigation system positions.

Example 10 includes the method of Example 9, wherein calibrating inertial measurements with satellite-based augmentation system position measurements comprises: identifying an aircraft position as a calibration reference point based on the satellite-based augmentation system position measurements; integrating inertial velocities from the inertial navigation system over a period of time to identify an integrated inertial navigation system position; and calculating an inertial navigation system drift based on the difference between the integrated inertial navigation system position and a corresponding satellite-based augmentation system position measurement.

Example 11 includes the method of any of Examples 9-10, wherein determining that the satellite-based augmentation system did not experience a fault when the inertial measurements were calibrated with the satellite-based augmentation system position measurements comprises determining that the satellite-based augmentation system did not experience a fault for a period of time greater than a latency period for identifying faults in the satellite-based augmentation system.

Example 12 includes the method of any of Examples 9-11, wherein monitoring the satellite-based augmentation system navigation position measurements based on the calibrated inertial measurements comprises: integrating inertial velocities from the inertial navigation system over a period of time to identify an integrated inertial navigation system position; and calculating a corrected inertial navigation system position by subtracting an average inertial navigation system drift from the integrated inertial navigation system position.

Example 13 includes the method of Example 12, wherein monitoring the satellite-based augmentation system navigation position measurements based on the calibrated inertial measurements further comprises: determining the difference between the satellite-based augmentation system position measurements and the corrected inertial navigation system position; and when the difference between the satellite-based augmentation system position measurements and the corrected inertial navigation system position exceed a threshold, determining that at least one of the inertial navigation system and the satellite-based augmentation system is providing misleading data.

Example 14 includes the method of Example 13, further comprising providing alert information to a flight crew to determine whether to aborting a localizer performance with vertical guidance approach when at least one of the inertial navigation system and the satellite-based augmentation system is providing misleading data.

Example 15 includes an aircraft landing system on an aircraft, the system comprising: an inertial navigation system configured to make inertial measurements of motion for the aircraft; a satellite-based augmentation system configured to provide satellite-based augmentation system position measurements of the aircraft; and a processor configured to receive the inertial measurements from the inertial navigation system and receive the satellite-based augmentation system position measurements from the satellite-based augmentation system, wherein the processor executes at least one instance of an inertial coasting algorithm, wherein an instance of an inertial coasting algorithm comprises: a calibration period, wherein the inertial coasting algorithm directs the processor to calibrate the inertial measurements to the satellite-based augmentation system position measurements; a substantiation period, wherein the inertial coasting algorithm directs the processor to determine whether the calibrated inertial measurements and satellite-based augmentation system position measurements are based on misleading data; and a monitoring period, wherein the inertial coasting algorithm directs the processor to compare the calibrated inertial measurements and the satellite-based augmentation system position measurements when the calibrated inertial measurements and satellite-based augmentation system position measurements are not based on misleading data.

Example 16 includes the aircraft landing system of Example 15, wherein the processor executes multiple instances of the inertial coasting algorithm, wherein the execution of each instance of the inertial coasting algorithm is separated by a time interval.

Example 17 includes the aircraft landing system of Example 16, wherein the time interval between each instance of the inertial coasting algorithm is the same.

Example 18 includes the aircraft landing system of any of Examples 15-17, wherein the processor begins executing the at least one instance of the inertial coasting algorithm when the aircraft reaches at least one of: an altitude in relation to the runway; and a distance from the runway.

Example 19 includes the aircraft landing system of any of Examples 15-18, wherein the inertial coasting algorithm directs the processor to calibrate the inertial measurements with the satellite-based augmentation system position measurements by calculating an average inertial navigation system drift based on an average difference between a plurality of integrated inertial navigation system positions and a corresponding plurality of satellite-based augmentation system position measurements.

Example 20 includes the aircraft landing system of Example 19, wherein the inertial coasting algorithm directs the processor to enter the substantiation period when the variance for the average inertial navigation system drift is below a variance threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An aircraft landing system on an aircraft, the system comprising:
    an inertial navigation system configured to make inertial measurements of motion for the aircraft;
    a satellite-based augmentation system configured to provide satellite-based augmentation system position measurements of the aircraft; and
    a processor configured to receive the inertial measurements from the inertial navigation system and receive the satellite-based augmentation system position measurements from the satellite-based augmentation system, wherein the processor executes instructions that cause the processor to:
        calibrate the inertial measurements to the satellite-based augmentation system position measurements;
        determine whether the satellite-based augmentation system experienced a fault when the inertial measurements were calibrated with the satellite-based augmentation system position measurements; and
        when the satellite-based augmentation system did not experience a fault, monitor the satellite-based augmentation system navigation position measurements based on the calibrated inertial measurements.

2. The aircraft landing system of claim 1, wherein the aircraft is navigated along a localizer performance with vertical guidance approach.

3. The aircraft landing system of claim 1, wherein the processor calibrates the inertial measurements to the satellite-based augmentation system position measurements by:
    identifying an aircraft position as a calibration reference point based on the satellite-based augmentation system position measurements;
    integrating at least one of inertial velocities and accelerations from the inertial navigation system over a period of time relative to a calibration reference point to identify an integrated inertial navigation system position; and
    calculating a time dependent inertial navigation system drift based on the difference between the integrated inertial navigation system position and a corresponding satellite-based augmentation system position measurement.

4. The aircraft landing system of claim 1, wherein the processor interpolates a plurality of calculated inertial navigation system drifts to find an average time dependent difference between a plurality of integrated inertial navigation system positions and a corresponding plurality of satellite-based augmentation system position measurements.

5. The aircraft landing system of claim 1, wherein the processor determines that the satellite-based augmentation system did not experience a fault when the inertial measurements were calibrated by determining that the satellite-based augmentation system did not experience a fault for a period of time greater than a latency period for identifying faults in the satellite-based augmentation system.

6. The aircraft landing system of claim 1, wherein the processor monitors the satellite-based augmentation system navigation position measurements based on the calibrated inertial measurements by:
    integrating at least one of inertial velocities and accelerations from the inertial navigation system over a period of time to identify an integrated inertial navigation system position; and
    calculating a corrected inertial navigation system position by subtracting an average inertial navigation system drift from the integrated inertial navigation system position.

7. The aircraft landing system of claim 6, wherein the processor further monitors satellite-based augmentation system position measurements of the aircraft based on the calibrated inertial measurements by:
    comparing the satellite-based augmentation system position measurements against the corrected inertial navigation system position; and
    when the difference between the satellite-based augmentation system position measurements and the corrected inertial navigation system position exceed a threshold, determining that at least one of the inertial navigation system and the satellite-based augmentation system is providing misleading data.

8. The aircraft landing system of claim 7, wherein the aircraft landing system provides alert information to flight crews to determine whether to abort a localizer performance with vertical guidance approach when at least one of the inertial navigation system and the satellite-based augmentation system is providing misleading data.

9. A method for navigational guidance, the method comprising:
  calibrating inertial measurements acquired from an inertial navigation system with satellite-based augmentation system position measurements acquired from a satellite-based augmentation system to create corrected inertial navigation system positions;
  determining whether the satellite-based augmentation system experienced a fault when the inertial measurements were calibrated with the satellite-based augmentation system position measurements; and
  when the satellite-based augmentation system did not experience a fault, monitoring the satellite-based augmentation system navigation position measurements based on the corrected inertial navigation system positions.

10. The method of claim 9, wherein calibrating inertial measurements with satellite-based augmentation system position measurements comprises:
  identifying an aircraft position as a calibration reference point based on the satellite-based augmentation system position measurements;
  integrating inertial velocities from the inertial navigation system over a period of time to identify an integrated inertial navigation system position; and
  calculating an inertial navigation system drift based on the difference between the integrated inertial navigation system position and a corresponding satellite-based augmentation system position measurement.

11. The method of claim 9, wherein determining that the satellite-based augmentation system did not experience a fault when the inertial measurements were calibrated with the satellite-based augmentation system position measurements comprises determining that the satellite-based augmentation system did not experience a fault for a period of time greater than a latency period for identifying faults in the satellite-based augmentation system.

12. The method of claim 9, wherein monitoring the satellite-based augmentation system navigation position measurements based on the calibrated inertial measurements comprises:
  integrating inertial velocities from the inertial navigation system over a period of time to identify an integrated inertial navigation system position; and
  calculating a corrected inertial navigation system position by subtracting an average inertial navigation system drift from the integrated inertial navigation system position.

13. The method of claim 12, wherein monitoring the satellite-based augmentation system navigation position measurements based on the calibrated inertial measurements further comprises:
  determining the difference between the satellite-based augmentation system position measurements and the corrected inertial navigation system position; and
  when the difference between the satellite-based augmentation system position measurements and the corrected inertial navigation system position exceed a threshold, determining that at least one of the inertial navigation system and the satellite-based augmentation system is providing misleading data.

14. The method of claim 13, further comprising providing alert information to a flight crew to determine whether to aborting a localizer performance with vertical guidance approach when at least one of the inertial navigation system and the satellite-based augmentation system is providing misleading data.

15. An aircraft landing system on an aircraft, the system comprising:
  an inertial navigation system configured to make inertial measurements of motion for the aircraft;
  a satellite-based augmentation system configured to provide satellite-based augmentation system position measurements of the aircraft; and
  a processor configured to receive the inertial measurements from the inertial navigation system and receive the satellite-based augmentation system position measurements from the satellite-based augmentation system, wherein the processor executes at least one instance of an inertial coasting algorithm, wherein an instance of an inertial coasting algorithm comprises:
    a calibration period, wherein the inertial coasting algorithm directs the processor to calibrate the inertial measurements to the satellite-based augmentation system position measurements;
    a substantiation period, wherein the inertial coasting algorithm directs the processor to determine whether the calibrated inertial measurements and satellite-based augmentation system position measurements are based on misleading data; and
    a monitoring period, wherein the inertial coasting algorithm directs the processor to compare the calibrated inertial measurements and the satellite-based augmentation system position measurements when the calibrated inertial measurements and satellite-based augmentation system position measurements are not based on misleading data.

16. The aircraft landing system of claim 15, wherein the processor executes multiple instances of the inertial coasting algorithm, wherein the execution of each instance of the inertial coasting algorithm is separated by a time interval.

17. The aircraft landing system of claim 16, wherein the time interval between each instance of the inertial coasting algorithm is the same.

18. The aircraft landing system of claim 15, wherein the processor begins executing the at least one instance of the inertial coasting algorithm when the aircraft reaches at least one of:
  an altitude in relation to the runway; and
  a distance from the runway.

19. The aircraft landing system of claim 15, wherein the inertial coasting algorithm directs the processor to calibrate the inertial measurements with the satellite-based augmentation system position measurements by calculating an average inertial navigation system drift based on an average difference between a plurality of integrated inertial navigation system positions and a corresponding plurality of satellite-based augmentation system position measurements.

20. The aircraft landing system of claim 19, wherein the inertial coasting algorithm directs the processor to enter the substantiation period when the variance for the average inertial navigation system drift is below a variance threshold.

* * * * *